(12) United States Patent
Karegoudar (10) Patent No.: US 8,731,053 B2
(45) Date of Patent: May 20, 2014

(54) METHOD OF MULTIPLEXING H.264 ELEMENTARY STREAMS WITHOUT TIMING INFORMATION CODED

(75) Inventor: Malateshgouda V. Karegoudar, Bangalore (IN)

(73) Assignee: Tektronix, Inc., Beaverton, OR (US)

( * ) Notice: Subject to any disclaimer, the term of this patent is extended or adjusted under 35 U.S.C. 154(b) by 319 days.

(21) Appl. No.: 12/944,565

(22) Filed: Nov. 11, 2010

(65) Prior Publication Data

US 2012/0099643 A1   Apr. 26, 2012

(30) Foreign Application Priority Data

Nov. 18, 2009   (IN) .......................... 2669/MUM/2009

(51) Int. Cl.
*H04N 7/12* (2006.01)
*H04N 11/02* (2006.01)
*H04N 11/04* (2006.01)

(52) U.S. Cl.
USPC ............ 375/240.06; 375/240.01; 375/240.24; 375/240.28

(58) Field of Classification Search
None
See application file for complete search history.

(56) References Cited

U.S. PATENT DOCUMENTS

| | | | |
|---|---|---|---|
| 7,551,672 B1 * | 6/2009 | Tahara et al. | 375/240.01 |
| 2005/0180512 A1 * | 8/2005 | Narasimhan et al. | 375/240.28 |
| 2006/0269012 A1 * | 11/2006 | Kim et al. | 375/270 |
| 2008/0137744 A1 * | 6/2008 | Moriya et al. | 375/240.15 |

FOREIGN PATENT DOCUMENTS

| | | |
|---|---|---|
| EP | 1069777 A1 | 1/2001 |
| EP | 1383333 A2 | 1/2004 |

OTHER PUBLICATIONS

"Advanced video coding for generic audiovisual services; H.264 (Mar. 2009); Annex E", ITU-T Standard, International Telecommunication Union, Geneva, CH, No. H.264 (Mar. 2009), Mar. 16, 2009, pp. 369-383, XP002622884.

"Advanced video coding for generic audiovisual services; H.264 (Mar. 2009); Annex C", ITU-T Standard, International Telecommunication Union, Geneva; CH, No. H.264 (Mar. 2009), Mar. 16, 2009, pp. 312-326, XP002622885.

"Digital Video Broadcasting (DVB); Specification for the use of Video and Audio Coding in Broadcasting Applications based on the MPEG-2 Transport Stream European Broadcasting Union Union Europeenne de Radio-Television Ebuoer; ETSI TS 101 154", ETSI Standards, LIS, Sophia Antipolis Cedex, France, vol. BC, No. VI.9.1, Sep. 30, 2009, pp. 28-32, XP002622886, ISSN: 0000-0001.

* cited by examiner

*Primary Examiner* — Joseph Ustaris
*Assistant Examiner* — Ellyar Y Barazesh
(74) *Attorney, Agent, or Firm* — Michael A. Nelson; Marger, Johnson & McCollom, P.C.

(57) ABSTRACT

Embodiments of the present invention multiplex elementary streams without timing information coded to create a transport stream. In some embodiments, 'n' number of access units are constructed and pushed into a list one by one. Each access unit is capable of looking ahead to obtain information on timing for the next access unit. A header is constructed by calculating timing information from the topmost access unit of the list. Said header is written in the transport stream and the remaining bytes of the transport stream are filled with data from the said elementary stream. Thus the transport stream is constructed.

14 Claims, 5 Drawing Sheets

Figure 1

(PRIOR ART)

Figure 2

(PRIOR ART)

METHOD OF MULTIPLEXING H.264 ELEMENTARY STREAMS WITHOUT TIMING INFORMATION CODED

FIELD OF THE INVENTION

The present invention relates generally to image processing. More specifically, it relates to the multiplexing of AVC (Advanced Video Codec) elementary streams.

BACKGROUND OF THE INVENTION

The digital broadcast industry is currently embracing multiple technology advancements including High Definition, Internet Protocol Television (IPTV), and Mobile Video. The key enabler for these technologies is the compression efficiencies and therefore lower bandwidth requirements of the H.264/AVC (Advanced Video Codec/MPEG-4, part 10) video codec. MPEG-2 ("Moving Picture Experts Group") and "H.264," both of which are international standards for moving image encoding processes, have defined an image frame or an image field as a unit of compression, called a "picture." Each "picture" is used as an access unit (AU) in encoding and decoding processes.

Extensions to the MPEG-2 standard to incorporate H.264/AVC as an additional Elementary Stream (ES) type within an MPEG-2 Transport Stream (TS) have made it accessible and attractive to broadcasters and network operators An elementary stream (ES) is basically a raw compressed representation of one audio or video signal. The format of the elementary stream depends upon the codec or data carried in the stream, and carries a common header when packetized into a packetized elementary stream.

In MPEG-2 systems, a video elementary stream is assembled into a packetized elementary stream (PES). Presentation Time Stamps (PTS) are carried in headers of the packetized elementary stream. Decoding time stamps (DTS) are also carried in PES headers of an I- or P-picture when bi-directional predictive coding is enabled.

An H.264 Video elementary stream is generally stored as a file while multiplexing in deferred mode. The H.264 Video elementary stream consists of a sequence of Network Abstraction Layer (NAL) unit syntax structures. NAL Units are classified into Video Coding Later (VCL) and non-VCL NAL Units. The VCL NAL units contain data that represent video pictures; non-VCL NAL Units contain additional information such as Sequence Parameter Set (SPS) and Picture Parameter Set (PPS) which apply to a large number of VCL NAL Units. Parameters in the Sequence Parameter Set (SPS) include identifier limits on the frame number, picture order count (POC), and frame rate of the stream. SEI NAL Units are also coded to enhance the usability, however are not necessary for decoding the VCL NAL units.

Typically, one or more sequence parameter set(s) and picture parameter set(s) are sent to the decoder prior to the decoding of the slice headers and slice data. A coded slice header refers to the picture parameter set and this activates the particular picture parameter set. The activated picture parameter set then remains active until a different picture parameter set is activated by being referred to in another slice header. Similarly, picture parameter set refers to the identifier which activates the sequence parameter set. The activated SPS remains active until a different sequence parameter set is activated.

Figure 1:
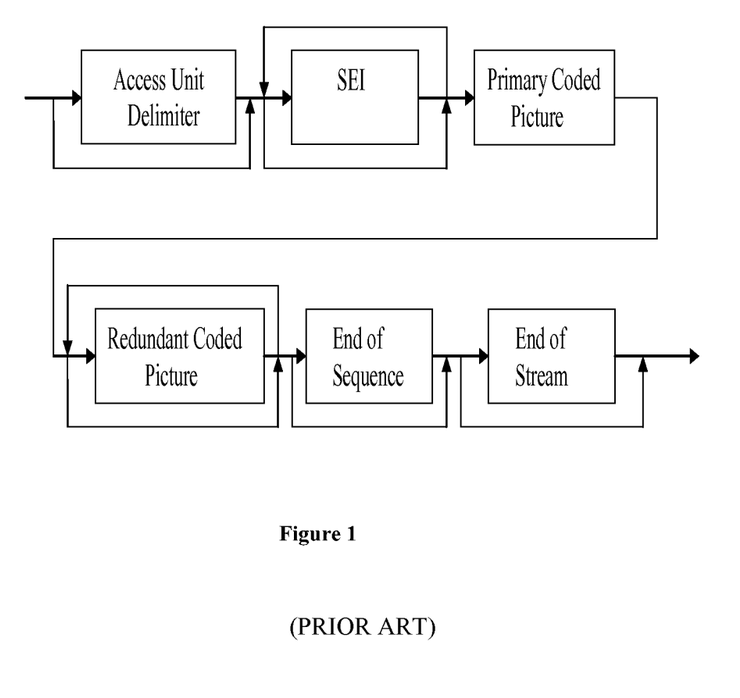
FIG. 1 illustrates the general structure of a conventional access unit.

An H.264 video elementary stream can be considered as a coded video sequence. A coded video sequence consists of one or more Access Units. Each Access Unit (AU) is a set of NAL units that always contain exactly one primary coded picture. In addition to the primary coded picture, an AU may also contain one or more redundant coded pictures or other NAL units not containing slices or slice data partitions of a coded picture. The decoding of an AU always results in a decoded picture. The general structure of a conventional access unit is shown in FIG. 1.

Packetized Elementary Streams (PES): For practical purposes, the endless continuous elementary streams carrying audio or video from compressors need to be broken into PES packets. These packets are identified by headers that contain time stamps (PTS and DTS) for synchronizing. PES packets can be used to create Program Streams or Transport Streams. After compression, pictures are sent out of sequence because of bidirectional coding. They require a variable amount of data and are subject to variable delay due to multiplexing and transmission. In order to keep the audio and video locked together, time stamps are periodically incorporated in each picture.

A time stamp is a 33-bit number that is a sample of a counter driven by a 90-kHz clock. This clock is obtained by dividing the 27-MHz program clock by 300. Since presentation times are evenly spaced, it is not essential to include a time stamp in every presentation unit. Instead, time stamps can be interpolated by the decoder, but they must not be more than 700 ms apart in either program streams or transport streams.

Time stamps indicate where a particular access unit belongs in time. Lip sync is obtained by incorporating time stamps into the headers in both video and audio PES packets. When a decoder receives a selected PES packet, it decodes each access unit and buffers it into RAM. When the time line count reaches the value of the time stamp, the RAM is read out. This operation has two desirable results. First, effective time base correction is obtained in each elementary stream. Second, the video and audio elementary streams can be synchronized together to make a program.

PES Packets are broken into fixed 188 byte TS packets. Transport Stream (TS) packets always begin with a header. The remainder of the packet carries data referred to as the payload. Each PES packet forms the payload of the TS packet. The TS header is relatively small, but for special purposes (e.g., to carry PCR) the header may be extended. In this case the payload gets smaller so that the overall size of the TS packet is unchanged.

Figure 2:
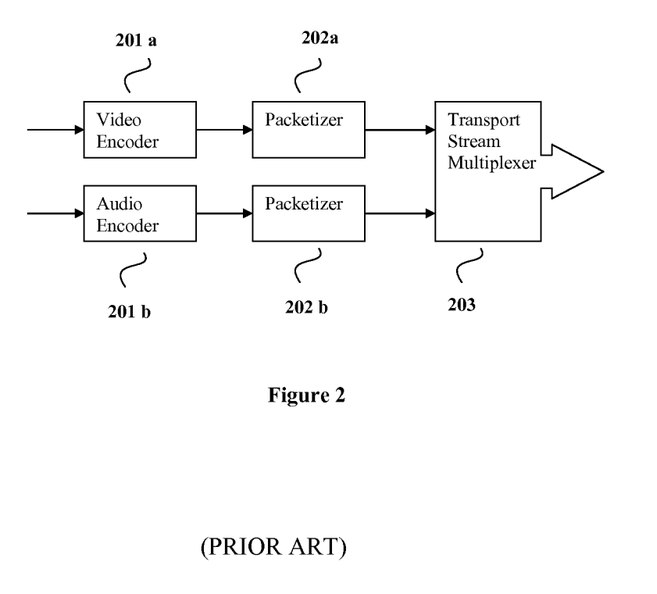
FIG. 2 depicts a conventional method of multiplexing audio and video into a single transport stream.

FIG. 2 depicts a conventional method of multiplexing audio and video streams into a single transport stream. Packetizers 202a and 202b receive video and audio streams from video encoder 201a and audio encoder 201b respectively. These streams are multiplexed in a TS multiplexer 203 to obtain a single transport stream at the output. Each access unit contains the primary coded picture. The primary coded picture can be an I slice (Intra Slice in case of IDR, Slice contains integer number of macroblocks), P slice (Predictive slice), or B-slice (a slice that may be decoded using intra prediction). The type of picture carried is obtained by decoding the slice-_type of the slice header. When the elementary stream contains access units with B-frames, the number of consecutive coded B-frames is variable and unbounded. The order of the coded frames in the bit-stream, also called the coded order, is the order in which a decoder reconstructs them. The order of the reconstructed frames at the output of the decoding process, also called the display order, is not always the same as the codec order. Presentation Time Stamp and Decode Time Stamp are coded in the PES headers which determine decode and display order of the pictures.

A Sequence Parameter Set also contains video usability information (VUI). HRD (Hypothetical Reference Decoder) parameters are signaled through video usability information. HRD parameters contain the bit-rate information and values of coded picture buffer and decoded picture buffer. The HRD is used to check conformance of bit-streams and decoders. Also, the HRD parameters along with the optional SEI messages, when present, help to calculate the PTS and DTS values of the pictures coded in the stream. See Annex C of the H.264 standard for more information.

When the H.264 Video Elementary stream do not have the HRD parameters in video usability information (VUI) coded, the number of reference parameter list list0 and list1 may be used for prediction. However, this can be a cumbersome process.

Thus there is required a method that eliminates the need of constructing the reference list list0 and list1 (as described in the standard) to obtain the timing information for those elementary streams that do not have timing information coded.

SUMMARY OF THE INVENTION

It is an object of the present invention to provide a mechanism that can be applied in deferred time multiplexing of high definition video elementary streams which do not have timing parameters coded.

Another object of the present invention is to provide a method for generating valid multiplex of video elementary streams to generate the Transport Stream (TS).

Accordingly, embodiments of the present invention provide an apparatus and methods of multiplexing elementary streams without timing information coded.

In some embodiments, 'n' number of access units (AU) are constructed and pushed into a list one by one. Each access unit is capable of looking ahead to obtain information on timing for the next access unit. A header is constructed by calculating timing information from the topmost access unit of the list. Said header is written in the TS and the remaining bytes of TS are filled with data from the said elementary stream. Thus the transport stream is constructed.

In some embodiments, primary picture types coded in each of the access units are checked iteratively and accordingly timing information including presentation time stamp (PTS) and decode time stamp (DTS) for each are calculated. Also, variable frame rate (tc) is derived for the elementary streams.

If the primary picture type coded is a B frame, then dts and pts are calculated as follows:

$$dts(n)=dts(n-1)+tc, \text{ and}$$

$$pts(n)=dts(n);$$

The B frames are decoded and presented at the same time without including any offset between pts and dts of the B frames.

For P and I type picture frames the dts and pts are calculated as follows:

$$dts(n)=dts(n-1)+tc, \text{ and}$$

$$pts(n)=dts(n)+pts\_offset*tc;$$

Next, access units are checked for the number of B frames (pts_offset) that precede before the next I or P frames occurs.

Other features of the present invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE INVENTION

Described herein are an apparatus and various methods of multiplexing high definition video elementary streams that do not have timing information coded to create a transport stream (TS). In some embodiments, 'n' number of access units (AU) are constructed and pushed into a list one by one. Each access unit is capable of looking ahead to obtain information on timing for the next access unit. A header is constructed by calculating timing information from the topmost access unit of the list. Said header is written in the TS and the remaining bytes of TS are filled with data from the said elementary stream. Thus the transport stream is constructed.

As explained above, embodiments of the present invention aim to provide a mechanism that can be applied in deferred time multiplexing of high definition video elementary streams which do not have timing parameters coded.

Figure 3:
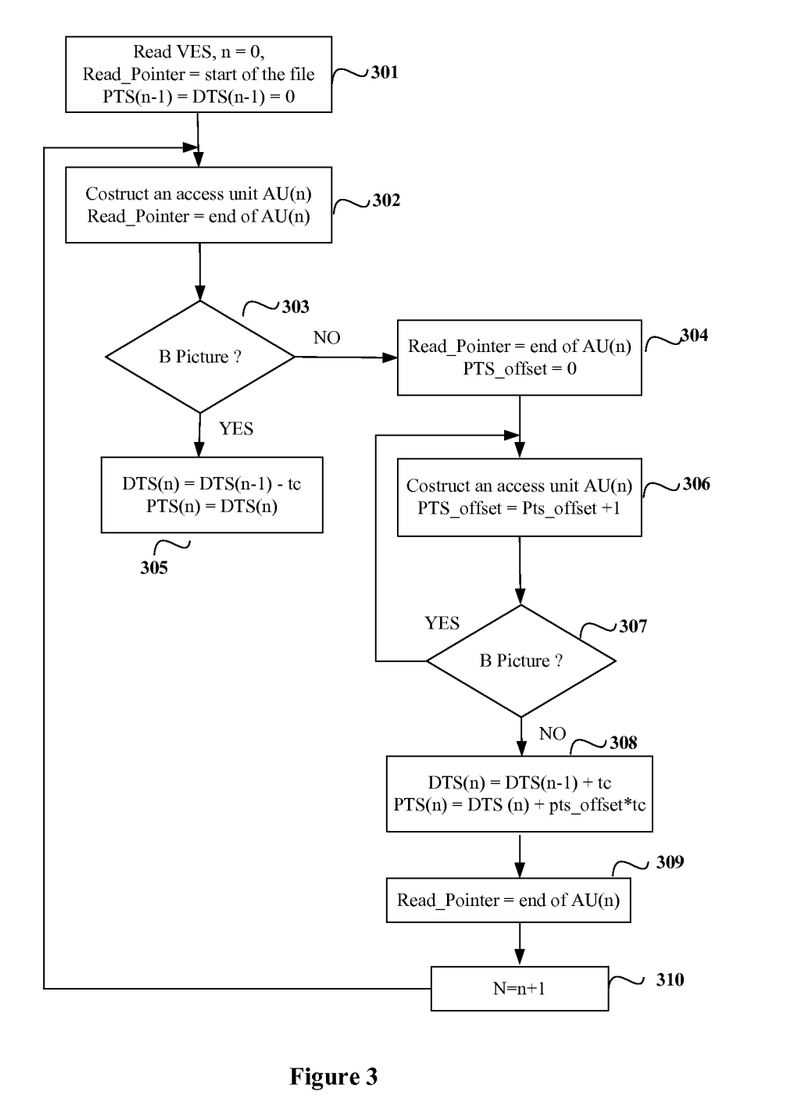
FIG. 3 depicts a flowchart of a look-ahead method according to an embodiment of the present invention.

For this, a look-ahead method is described below and is also shown in FIG. 3. This look-ahead method is a way of frame-reordering within the decoding process without constructing the reference list list0 and list1 (as described in the standard). When the video sequence contains no B-frames, the coded order is always the same as the display order. The occurrence of B-slices means that the coded order of video frames will be different than the display order. When multiplexed the order of the coded frames should not change, which implies that the PTS values associated with them will jump up and down a bit.

Look-Ahead Method of Calculation Time Stamps:

FIG. 3 depicts a flowchart of a look-ahead method according to an embodiment of the present invention. The look-ahead method maintains a list of 'n' number access units, active AU list which is used for multiplexing. In step 301 and in the beginning, the list is empty. While converting elementary streams to packetized elementary streams, the start point is noted. In step 302, the elementary stream is read from the start until it forms a single access unit. The end point is also noted in step 302.

An access unit is a segment of an elementary stream that represents a small logical unit of data. Often, an access unit can be used directly without reference to other parts of the elementary stream. For example, a single frame of video may be an access unit, or a section of a file representing a 32 ms period of time, when decoded.

In some embodiments, the primary picture types coded in each of the access units are checked iteratively and accordingly timing information including presentation time stamp (PTS) and decode time stamp (DTS) for each are calculated. Also, variable frame rate (tc) is derived for the elementary streams. In step 303, each AU is checked for B-type primary picture type so that PTS and DTS values may be calculated in next steps.

For calculating the PTS and DTS values, initially a variable tc (or frame rate/field rate depending on the case) is derived as follows and is called a clock tick.

$tc$=num_units_in_tick/time_scale, $n$=0, dts($n$−1)=0, pts($n$−1)=0 because the activeAUlist is empty.

num_units_in_tick and time_scale are part of the video usability information of the active sequence parameter set.

As the sequence parameter set becomes active depending on the identifier coded in active picture parameter set, the value tc can be changed and it would not remain fixed through the stream.

After a single access unit is formed, it is pushed to the activeAUlist. Depending on the picture coded in the access unit pushed to the list, it is decided whether to look for the next frame to occur in the stream. As mentioned in step 303 above, each AU is checked for B-type primary picture type. If the primary picture coded in AU formed is a B frame, then in step 305 DTS and PTS are calculated as: dts (n)=dts (n−1)+tc, and pts(n)=dts(n). The B frames are decoded and presented at the same time. There is no offset between pts and dts of the B frames.

In step 304, end point of the AU is noted and PTS offset is set as zero. For other frames I or P, in step 306, next access units are constructed, and in step 307 the next AUs are checked for the number of B frames (pts_offset) that precede before the next I or P frames occurs. Once this information is available, in step 308 DTS and PTS are calculated as dts(n)= dts(n−1)+tc and pts(n)=dts(n)+pts_offset*tc.

Now the file pointer is stored back to the end of the access unit(n), which was pushed to activeAUlist in step 309. This is one iteration of forming the access unit. For subsequent iterations, the value of 'n' is increased by one in step 310 and the steps 301 to 309 are repeated.

The look-ahead method is followed for the streams which do not have HRD parameters as part of their VUI syntax element of the SPS. For the streams which carry the HRD information as part of their SPS, SEI information and HRD parameters (Nal hr dor vcl hrd, which ever coded) are used to calculate the timing information. See Annex C of ITU-T H.264 Advanced video coding for generic audiovisual services for equations to calculate the timings for the access unit.

Figure 4:
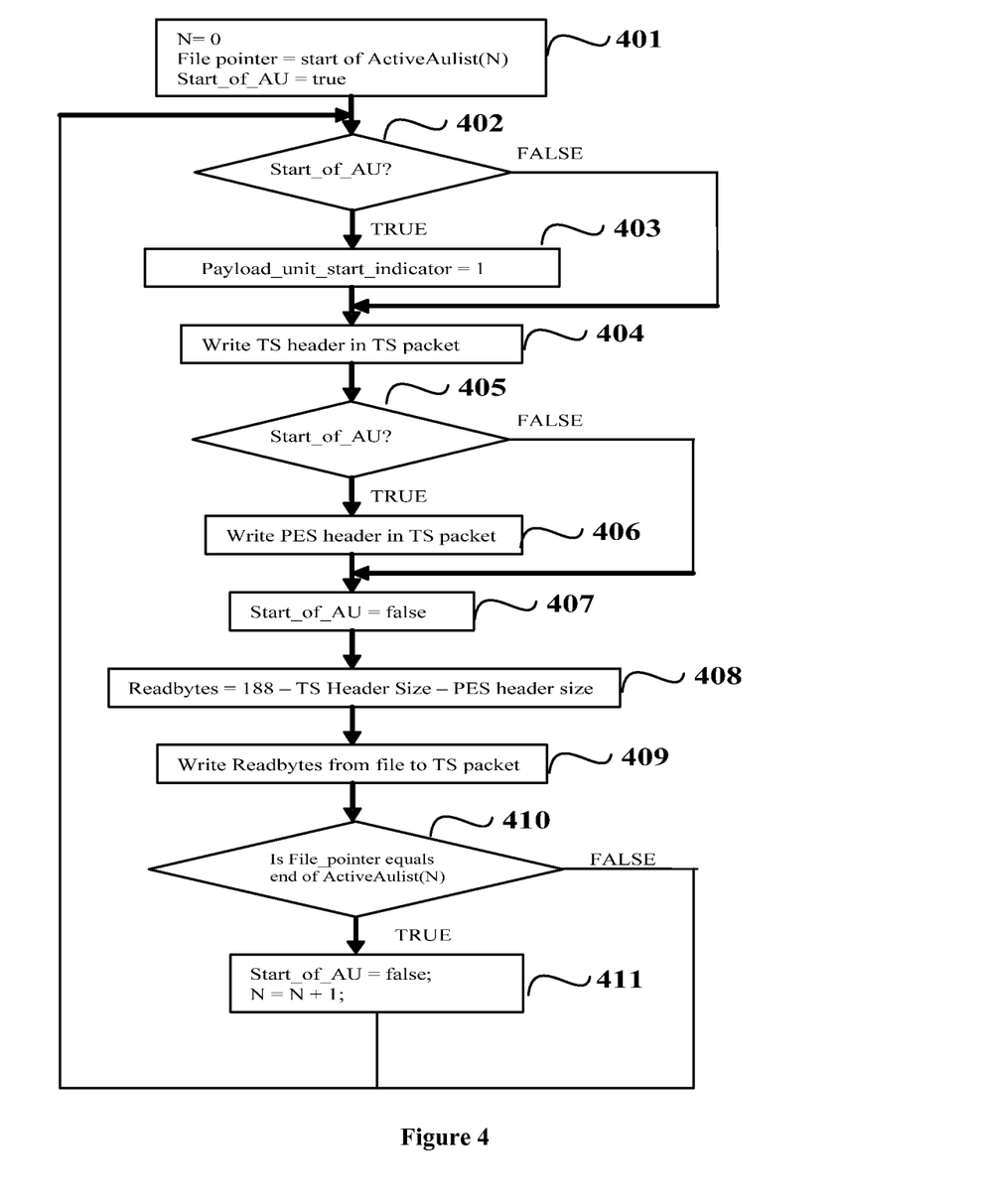
FIG. 4 depicts a method of multiplexing high definition video elementary streams to transport streams according to an embodiment of the present invention.

This activeAUlist formed using look-ahead method is used for multiplexing. FIG. 4. depicts a method of multiplexing the H.264 elementary streams to transport streams according to an embodiment of the present invention.

Referring now to FIG. 4, in step 401, the top element of the list contains the Access Unit (AU) to be written to the transport stream. In step 402, the start of the AU is checked. In step 403, when the AU starts in the TS packet, payload_unit_start_indicator is marked as True, and in step 404 TS header is written in TS packet. This indicates that the TS payload contains a PES start. Therefore start of AU is checked again in step 405. When start of AU is found to be True, PES header is written in TS packet, in step 406, since the first byte of the TS payload should contain the value start byte of PES header. Then, in step 407, start of AU is set as False. The size of TS payload would reduce by a byte in this case. The readbytes are therefore calculated in step 408 as: Readbytes=188−TS header size−PES header size. In step 409 the Readbytes are written from file to TS packet. The PES header is constructed, with PTS and DTS values from the top element of activeAUlist. This PES header is included in the TS payload. The remaining bytes of TS payload are then filled with the H.264 access unit. Thus, the end of the topmost AU is checked in step 410, and if end of topmost AU is found to be True, start of AU is set as False in step 411 to end one iteration of TS construction. For subsequent iterations, value of 'n' is increased by one in step 411 and steps 401 to 410 are repeated.

Figure 5:
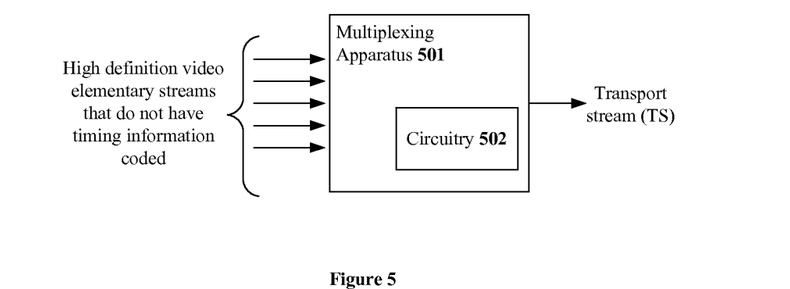
FIG. 5 depicts a block diagram of a multiplexing apparatus according to an embodiment of the present invention.

FIG. 5 shows a block diagram of a multiplexing apparatus according to an embodiment of the present invention. The apparatus 501 comprises a circuitry 502 for multiplexing high definition video elementary streams that do not have timing information coded, to create a transport stream (TS). The circuitry 502 is capable of constructing 'n' number of access units (AU) in a list. Each AU may be constructed such that it is capable of looking ahead to obtain information on timing for the next AU. Said circuitry 502 is further capable of initiating a pointer to indicate start of an AU from the list; iteratively checking start of an AU from the list; constructing a header by calculating the timing information from the topmost AU of the list; writing the header in the TS; and filling the remaining bytes of TS with data from the said elementary stream.

The circuitry 502 of the apparatus 501 enables the start of the topmost AU to be checked and marks the payload_unit_start_indicator as True. The circuitry 502 also enables the TS header to be written in TS packet. This indicates that the TS payload contains a PES start. Therefore the circuitry 502 checks the start of AU again. When the start of the AU is found to be True, PES header is written in TS packet, since the first byte of the TS payload should contain the value start byte of PES header. Then, the circuitry 502 sets the start of the AU as False. The size of TS payload would reduce by a byte in this case. The readbytes is therefore calculated as: Readbytes=188−TS header size−PES header size. The circuitry 502 further enables the Readbytes to be written from file to TS packet. The PES header is constructed, with PTS and DTS values from the top element of activeAUlist. This PES header is included in the TS payload. The remaining bytes of TS payload are then filled with the H.264 access unit. Thus, the end of the topmost AU is checked and if the end of the topmost AU is found to be True, the start of the AU is set as False to end one iteration of TS construction by the circuitry 502 of the apparatus. For subsequent iterations, and TS constructions, the value of 'n' is increased by one.

Application of the Present Invention:

The various embodiments described herein may be used to generate valid multiplex of H.264 video elementary stream to generate the MPEG-2 Transport Stream (TS). They may be applied in deferred time multiplexing of H.264 video elementary streams which do not have either NAL/VCL-HRD parameters coded (as part of VUI information of the Sequence Parameter Set) or Supplemental Enhancement Information (SEI). Each Access Unit (AU) of H.264 elementary stream may look ahead for the information about the picture type of the next Access Units in the file. This picture type information may be used to calculate the PTS and DTS values of the Packetized Elementary Stream (PES). Each AU may then be packetized to PES Packets and then broken into the stream of TS packets.

The invention described herein is explained using specific exemplary details for better understanding. However, the invention disclosed can be worked on by a person skilled in the art without the use of these specific details. The invention may be implemented in hardware as well as software. Structures and devices shown in block diagram are illustrative of exemplary embodiments of the invention and are meant to avoid obscuring the invention. Also, the connections between various elements may not necessarily be direct and the data transfer in between can be subjected to encoding, re-formatting or modifications.

References in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

The foregoing description of the present invention has been described for purposes of clarity and understanding. It is not intended to limit the invention to the precise form disclosed.

What is claimed is:

1. A method for multiplexing high definition video elementary streams that do not have timing information coded to create a transport stream (TS), the method comprising the steps of:
   constructing 'n' number of access units (AU) in a list, each AU capable of looking ahead to obtain information on timing for the next AU, including
      reading the elementary stream from the start while converting elementary streams to packetized elementary streams (PES) until it forms a single AU and noting its start and end points,
      pushing the just formed single AU into the list,
      checking primary picture type coded in the AU pushed into the list,
      calculating the timing information including a presentation time stamp (PTS), a decode time stamp (DTS), and deriving variable frame rate (tc) for the elementary streams,
      calculating dts(n)=dts(n−1)+tc, and
         pts(n)=dts(n) if the primary picture type coded is a B frame, and
      decoding B frames and presenting at the same time without including any offset between pts and dts of the B frames,
      calculating dts(n)=dts(n−1)+tc, and
         pts(n)=dts(n)+pts_offset*tc if the primary picture coded type is an I or P frame, and checking next access units for the number of B frames (pts_offset) that precede before the next I or P frames occurs, and
      constructing a next AU and pushing the next AU into the list for repeating the steps of calculating timing information;
   initiating a pointer to indicate start of an AU from the list;
   iteratively checking start of an AU from the list;
   constructing a header by calculating timing information from the topmost AU of the list;
   writing the header in the TS; and
   filling the remaining bytes of TS with data from an elementary stream.

2. The method as in claim 1 wherein the high definition elementary streams are H.264/AVC video elementary streams.

3. The method as in claim 1 wherein the TS is an MPEG-2 TS.

4. The method as in claim 1 wherein the multiplexing is multiplexing of H.264 video elementary streams which do not have either NAL/VCL-HRD parameters coded (as part of VUI information of the Sequence Parameter Set) or Supplemental Enhancement Information (SEI).

5. The method as in claim 1 wherein picture type (B, P, or I) information is used to calculate the PTS and DTS values of the Packetized Elementary Stream (PES).

6. The method as in claim 1 wherein variable tc is frame rate or field rate and is derived as tc=num_units_in_tick/time_scale.

7. The method as in claim 1 wherein PES packets are broken into fixed 188 byte TS packets.

8. An apparatus comprising circuitry for multiplexing high definition video elementary streams that do not have timing information coded to create a transport stream (TS) according to the steps of:
   constructing 'n' number of access units (AU) in a list, each AU looking ahead to obtain information on timing for the next AU, including
      reading the elementary stream from the start while converting elementary streams to packetized elementary streams (PES) until it forms a single AU and noting its start and end points,
      pushing the just formed single AU into the list,
      checking primary picture type coded in the AU pushed into the list,
      calculating the timing information further including a presentation time stamp (PTS), a decode time stamp (DTS), and deriving variable frame rate (tc) for the elementary streams,
      calculating dts(n)=dts(n−1)+tc, and
         pts(n)=dts(n) if the primary picture type coded is a B frame, and
      decoding B frames and presenting at the same time without including any offset between pts and dts of the B frames,
      calculating dts(n)=dts(n−1)+tc, and
         pts(n)=dts(n)+pts_offset*tc if the primary picture coded type is an I or P frame, and checking next access units for the number of B frames (pts_offset) that precede before the next I or P frames occurs, and
      constructing a next AU and pushing the next AU into the list for repeating the steps of calculating timing information,
   initiating a pointer to indicate start of an AU from the list;
   iteratively checking start of an AU from the list;
   constructing a header by calculating the timing information from the topmost AU of the list;
   writing the header in the TS; and
   filling the remaining bytes of TS with data from an elementary stream.

9. The apparatus in claim 8 wherein the high definition elementary streams are H.264/AVC video elementary streams.

10. The apparatus in claim 8 wherein the TS is an MPEG-2 TS.

11. The apparatus in claim 8 wherein the multiplexing is multiplexing of H.264 video elementary streams which do not have either NAL/VCL-HRD parameters coded (as part of VUI information of the Sequence Parameter Set) or Supplemental Enhancement Information (SEI).

12. The apparatus as in claim 8 wherein picture type (B, P, or I) information is used to calculate the PTS and DTS values of the Packetized Elementary Stream (PES).

13. The apparatus as in claim 8 wherein variable tc is frame rate or field rate and is derived as tc=num_units_in_tick/time_scale.

14. The apparatus as in claim 8 wherein PES packets are broken into fixed 188 byte TS packets.

\* \* \* \* \*

UNITED STATES PATENT AND TRADEMARK OFFICE
CERTIFICATE OF CORRECTION

PATENT NO. : 8,731,053 B2  
APPLICATION NO. : 12/944565  
DATED : May 20, 2014  
INVENTOR(S) : Malateshgouda V. Karegoudar Page 1 of 1

It is certified that error appears in the above-identified patent and that said Letters Patent is hereby corrected as shown below:

Title Page Assignee: "Tektronix, Inc." should be replaced with --Tektronix International Sales GmbH--

Signed and Sealed this
Twenty-sixth Day of July, 2016

Michelle K. Lee
*Director of the United States Patent and Trademark Office*